(12) United States Patent
Park et al.

(10) Patent No.: US 7,008,811 B2
(45) Date of Patent: Mar. 7, 2006

(54) METHOD OF FABRICATING PROBE FOR SPM HAVING FET CHANNEL STRUCTURE UTILIZING SELF-ALIGNED FABRICATION

(75) Inventors: Hong-Sik Park, Seoul (KR); Hyun-Jung Shin, Seongnam-si (KR); Ju-Hwan Jung, Seoul (KR)

(73) Assignee: Samsung Electronics Co., Ltd., Gÿeonggi do (KR)

( * ) Notice: Subject to any disclaimer, the term of this patent is extended or adjusted under 35 U.S.C. 154(b) by 0 days.

(21) Appl. No.: 10/513,170

(22) PCT Filed: Apr. 26, 2003

(86) PCT No.: PCT/KR03/00852

§ 371 (c)(1),
(2), (4) Date: Nov. 2, 2004

(87) PCT Pub. No.: WO03/096429

PCT Pub. Date: Nov. 20, 2003

(65) Prior Publication Data

US 2005/0214966 A1  Sep. 29, 2005

(30) Foreign Application Priority Data

May 8, 2002  (KR)  ...................... 10-2002-0025399

(51) Int. Cl.
*H01L 21/00*  (2006.01)
(52) U.S. Cl. ........................................ 438/48; 438/666
(58) Field of Classification Search .................. 438/48, 438/622, 638, 666, 672
See application file for complete search history.

(56) References Cited

U.S. PATENT DOCUMENTS

| | | | |
|---|---|---|---|
| 5,618,760 A | | 4/1997 | Soh et al. |
| 6,022,797 A | * | 2/2000 | Ogasawara et al. ......... 438/622 |
| 6,521,921 B1 | * | 2/2003 | Lim et al. .................... 257/255 |

FOREIGN PATENT DOCUMENTS

| | | |
|---|---|---|
| JP | 8-86788 A2 | 4/1996 |
| KP | 2001-45981 A | 6/2001 |

* cited by examiner

*Primary Examiner*—Phuc T. Dang
(74) *Attorney, Agent, or Firm*—Sughrue Mion, PLLC

(57) ABSTRACT

Provided is a method of fabricating a probe for a scanning probe microscope (SPM) having a field effect transistor (FET) channel structure utilizing a self-aligned fabrication. The provided method includes a first step of forming a first-shaped mask layer on a substrate and forming a source region and a drain region in regions of the substrate except for the mask layer; a second step of patterning a first-shaped photoresist in a perpendicular direction to the mask layer and performing an etching process to form a second-shaped mask layer; and a third step of etching the regions of the substrate except for the mask layer to form a probe. The provided method aligns the center of a tip with the center of a channel existing between the source region and the drain region to realize a tip having a size of tens of nanometers. Thus, a nano-device can be easily manufactured using the probe having the tip.

6 Claims, 7 Drawing Sheets

METHOD OF FABRICATING PROBE FOR SPM HAVING FET CHANNEL STRUCTURE UTILIZING SELF-ALIGNED FABRICATION

The application is a 371 PCT/KR03/00852 filed Apr. 26, 2003.

BACKGROUND OF THE INVENTION

This application claims the benefit of Korean Patent Application No. 2002-25399, filed on May 8, 2002, in the Korean Intellectual Property Office, the disclosure of which is incorporated herein in its entirety by reference.

1. Field of the Invention

The present invention relates to a method of fabricating a probe for a scanning probe microscope (SPM) having a field effect transistor (FET) channel structure, and more particularly, to a method of fabricating a probe for an SPM in order to easily fabricate a nano-device.

2. Description of the Related Art

Nowadays, as demands of small products, such as mobile communication terminals and electronic notebooks, increase, the need for small-sized and highly integrated nonvolatile recording media also increases. Since it is difficult to reduce the size of existing hard disks and to highly integrate flash memories, information storage apparatuses using scanning probes and methods thereof have been studied.

Probes can be utilized in various SPM technologies, for example, a scanning tunneling microscope (STM) for reproducing information by detecting currents that flow according to the difference between a voltage applied to a probe and a voltage applied to a specimen, an atomic force microscope (AFM) using an atomic force between a probe and a specimen, a magnetic force microscope (MFM) using a force between a magnetic field of a specimen and a magnetized probe, a scanning near-field optical microscope (SNOM) improving a limit in resolution due to the wavelength of visible rays, and an electrostatic force microscope (EFM) using static electricity between a specimen and a probe.

In order to record and reproduce high-density information at high speed by using the SPM technologies, surface charges existing in a small area of tens of nanometers should be detected. In addition, a cantilever of an array shape should be manufactured in order to improve recording and reproducing speeds.

FIGS. 1A and 1B are a perspective view and an enlarged view of a probe for an SPM having an FET channel structure according to Korean Patent No. 2001-45981.

Referring to FIG. 1A, a bar-shape probe 10 formed by etching a semiconductor substrate 20 is protruded from the substrate 20, and electrode pads 20a and 20b are arranged at both sides of an end portion where the probe 10 and the substrate 20 are connected.

Referring to FIG. 1B, an enlarged view of portion A in FIG. 1A, source and drain regions 11 and 13 are formed on an inclined surface at the end of a V-shape tip of the probe 10. In addition, a channel region 12 is formed between the source and the drain regions 11 and 13.

Since the tip of the probe is located at the end of a cantilever, it is difficult to manufacture an array-shape cantilever and the tip having a radius of tens of nanometers. In a conventional method, a tip having a radius of tens of nanometers is manufactured using various processes, such as an oxidation process, so that the tip is vertically formed on the cantilever.

However, the precision of a photolithographic process deteriorates when a tip having a height of several micrometers is formed, so it is difficult to form source and drain regions having a short channel length. In addition, even when the short channel length is realized using a diffusion process, it is difficult to align the center of the short channel at the end of the tip due to an alignment error in the photolithographic process.

SUMMARY OF THE INVENTION

The present invention provides a method of fabricating a probe for a scanning probe microscope (SPM) having a field effect transistor (FET) channel structure utilizing a self-aligned fabrication to form a tip having a source and a drain with a short channel length at the end and having the center of the channel aligned at the end.

According to an aspect of the present invention, there is provided a method of fabricating a probe comprising a first step of forming a first-shaped mask layer on a substrate and forming a source region and a drain region in regions of the substrate except for the region masked by the mask layer; a second step of patterning a first-shaped photoresist in a perpendicular direction to the mask layer and performing an etching process to form a second-shaped mask layer; and a third step of etching the regions of the substrate except for the region masked by the mask layer to form a probe.

It is preferable that the first-shaped mask layer is a striped-shaped mask layer.

It is preferable that the second-shaped mask layer is a square-shaped mask layer.

It is preferable that the first step further comprises performing a thermal diffusion process to reduce the distance between the source region and the drain region.

When the ions are n-type ions, the substrate is a p-type substrate. When the ions are p-type ions, the substrate is an n-type substrate.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described in more detail with reference to the accompanying drawing.

FIGS. 2A through 2I are perspective views illustrating a method of fabricating a probe having a field effect transistor (FET) channel structure, according to an embodiment of the present invention.

The method includes forming source and drain regions, etching a mask into a predetermined shape, and forming a probe. Here, the present invention uses a self-aligned fabrication wherein the mask used to form the source and the drain regions is used as a mask in the etching process to form the probe.

Figure 1A:
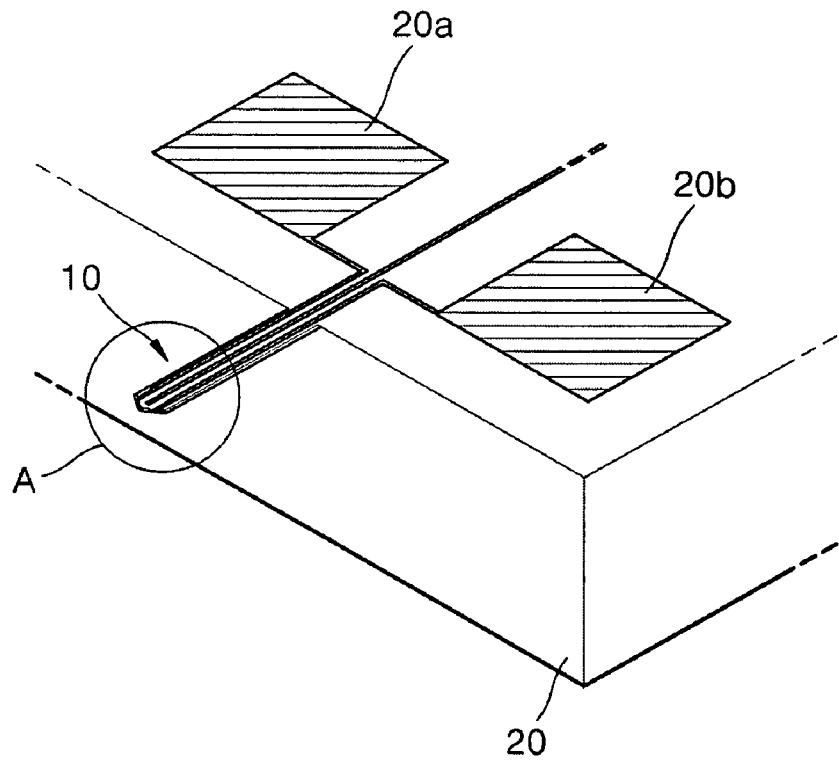
FIG. 1A is a perspective view illustrating a probe for a scanning probe microscope (SPM) disclosed in Korea Patent No. 2001-45981.
Figure 1B:
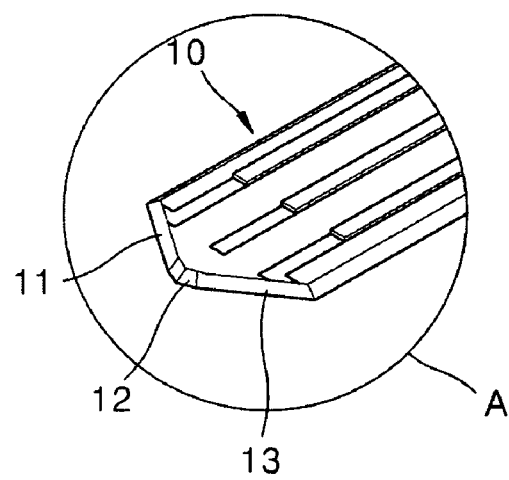
FIG. 1B is an enlarged view of portion A in FIG. 1A.
Figure 2A:
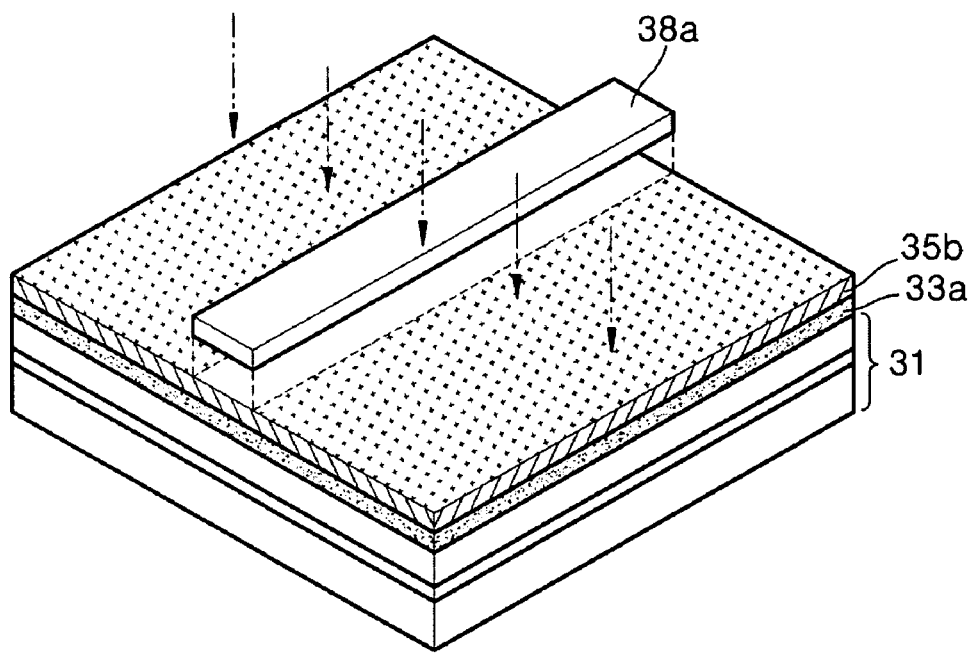
FIGS. 2A through 2I are perspective views illustrating a method of fabricating a probe for an SPM according to an embodiment of the present invention.
Figure 2B:
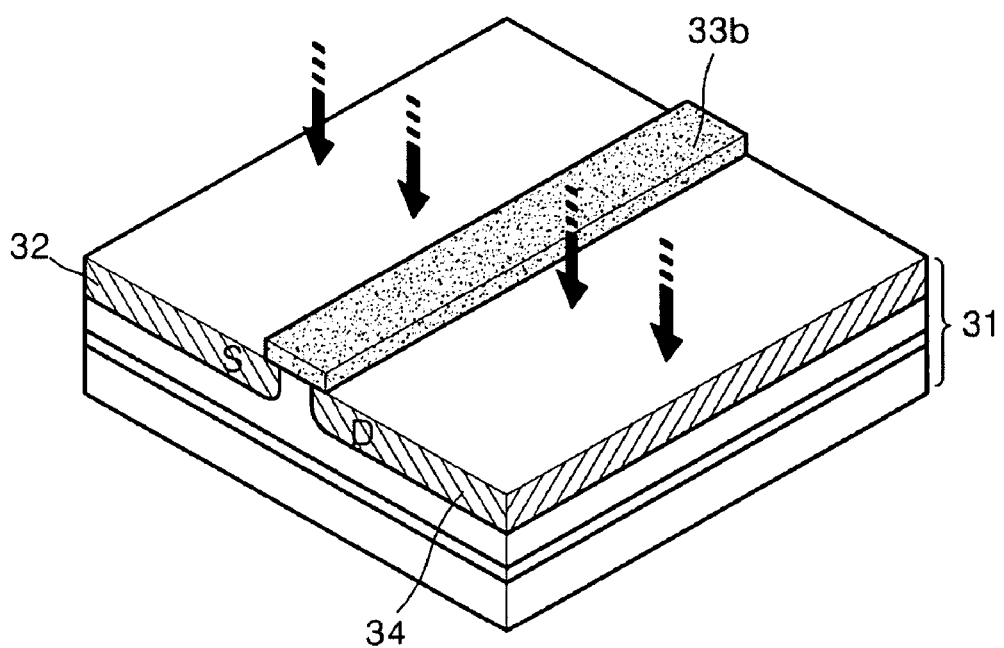

In order to form a source region S and a drain region D, a photolithographic process and an ion implantation process as shown in FIGS. 2A and 2B, respectively, are performed.

First, as shown in FIG. 2A, a mask layer 33a is formed on a substrate 31 and a photoresist 35a is coated on the mask layer 33a. Thereafter, a stripe-shaped photomask 38a is arranged on the photoresist 35a and exposure, development, and etching processes are performed.

Next, as shown in FIG. 2B, an ion implantation process is performed on the regions except for the stripe-shaped mask layer 33a to form source and drain regions 32 and 34.

When the substrate 31 is an n-type substrate, the source and the drain regions 32 and 34 are doped with p-type ions. When the substrate 31 is a p-type substrate, the source and the drain regions 32 and 34 are doped with n-type ions.

Figure 2C:
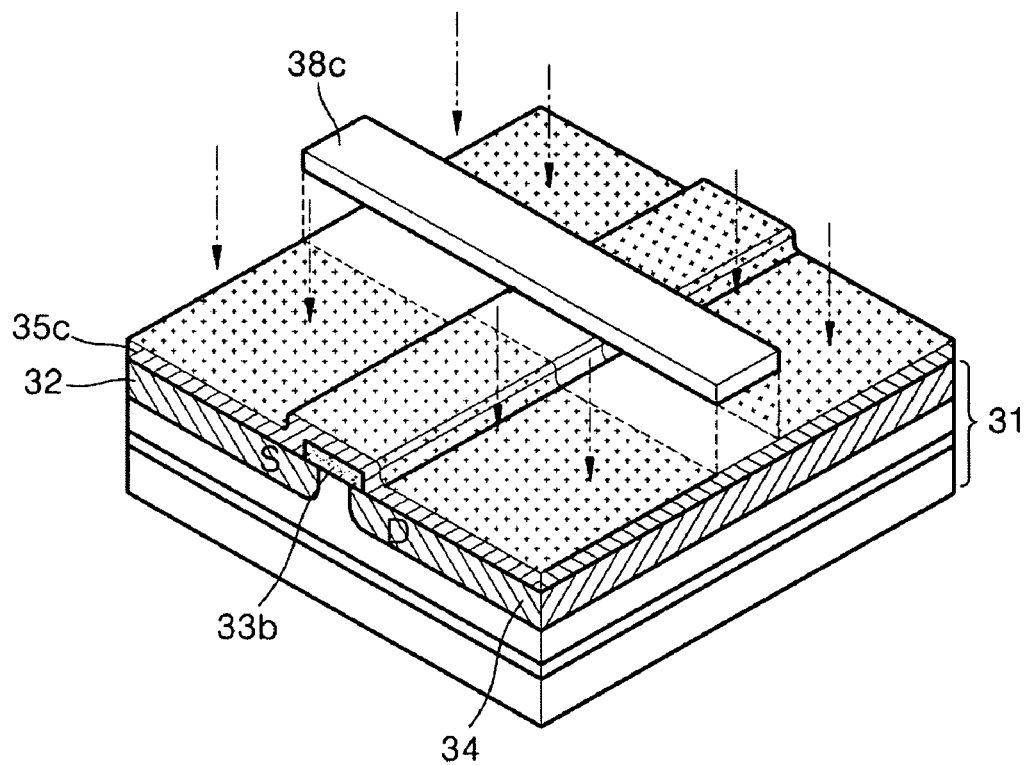
Figure 2D:
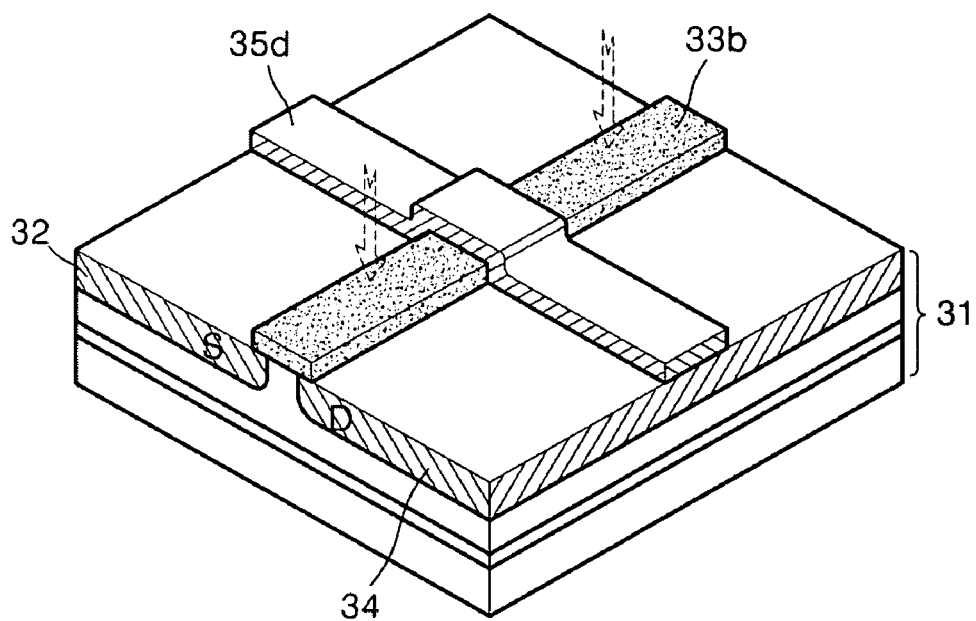
Figure 2E:
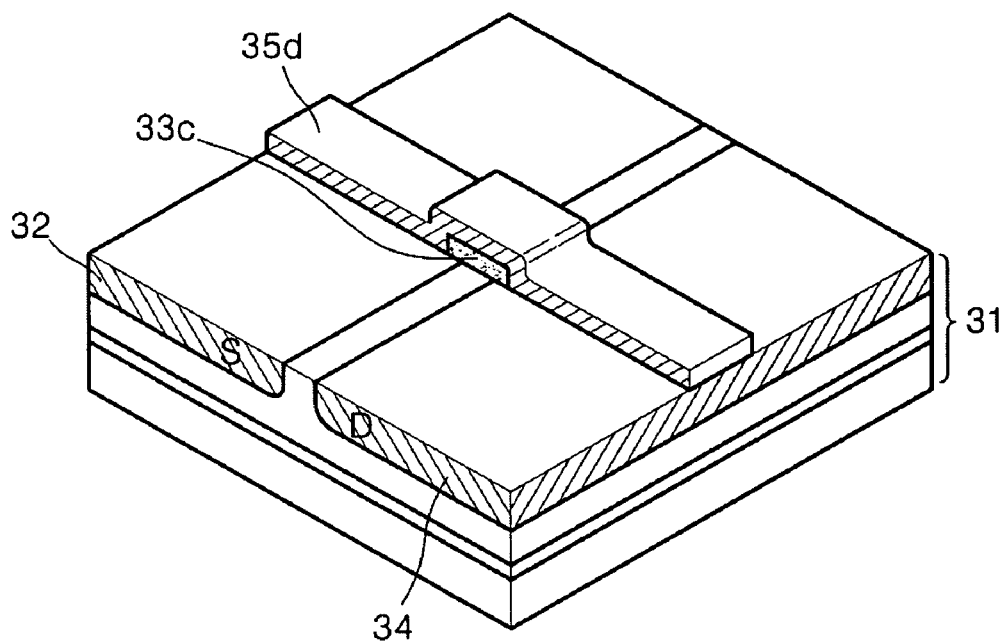
Figure 2F:
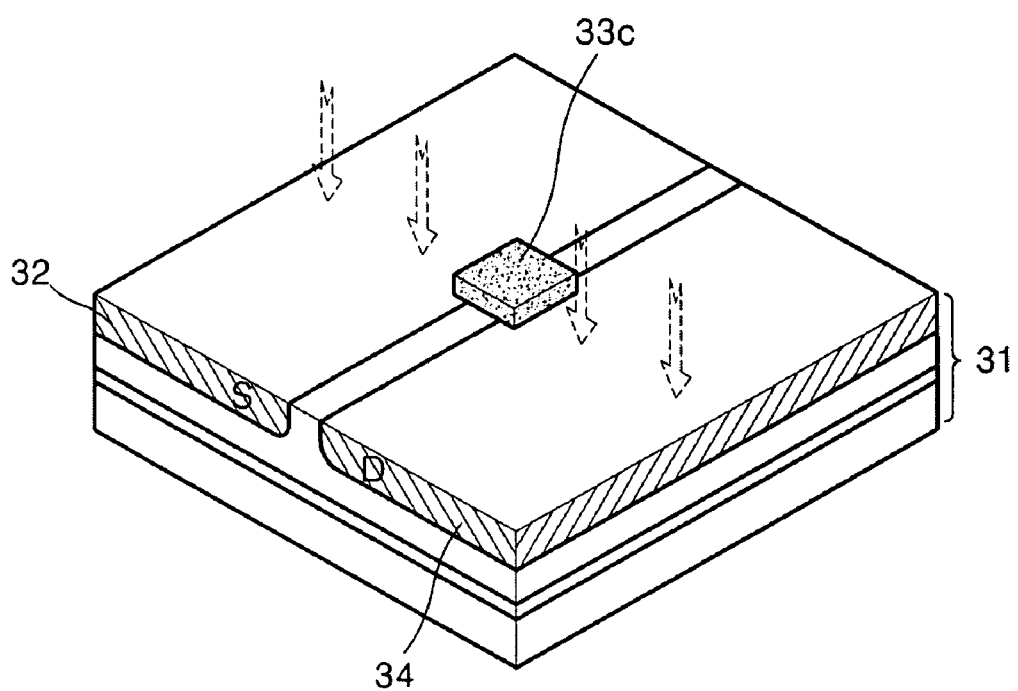

Since a mask layer 33c located on a tip 30 as shown in FIG. 2F will serve as a mask in an etching process when forming the tip 30, the width of the mask layer 33b of FIG. 2B should be maintained to a predetermined size. Thus, there is a limit in reducing the width of the stripe-shaped mask layer 33a in the photolithographic process of FIG. 2A.

Figure 2G:
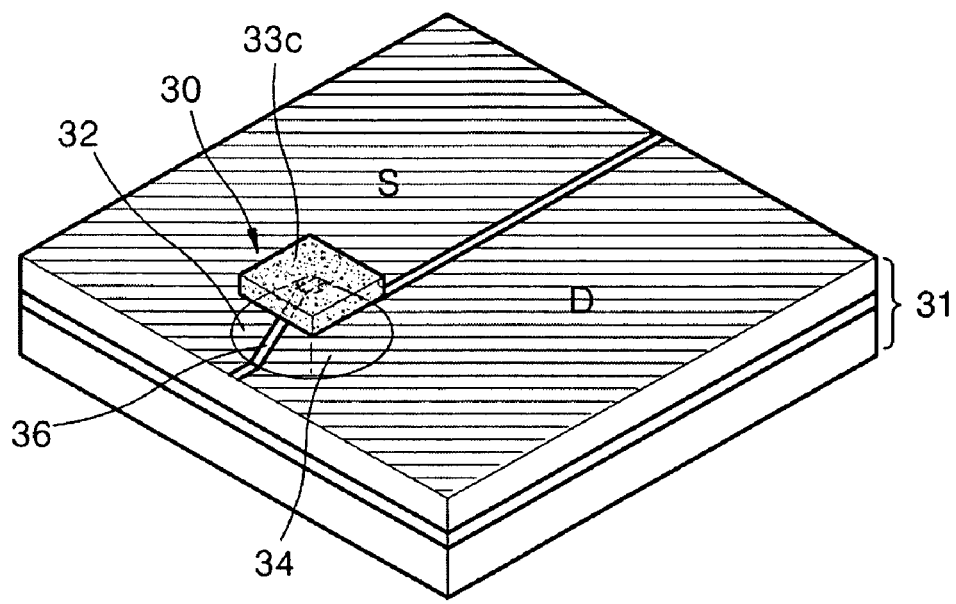
Figure 2H:
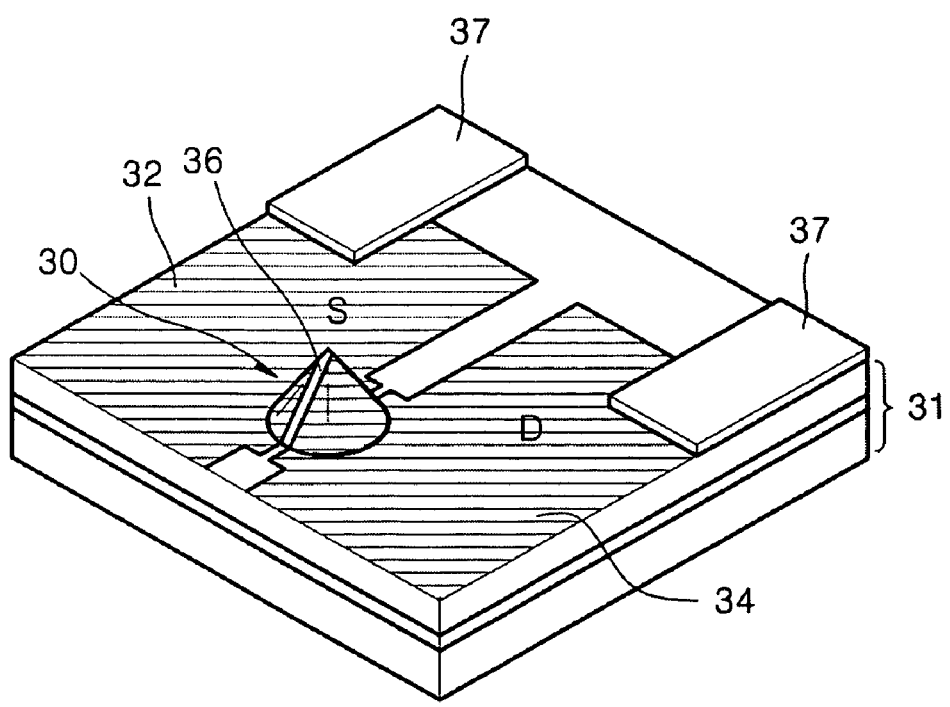

In addition, since the width of a channel region 36 between the source and the drain regions 32 and 34 shown in FIG. 2H depends on the width of a mask layer 33c of FIG. 2G, an additional annealing process is performed after implanting ions in the process of FIG. 2G in order to reduce the width of the channel region 36. Accordingly, the length of the channel region 36 between the source and the drain regions 32 and 34 is reduced while maintaining the width of the mask layer 33g.

Thereafter, a photolithographic process and an etching process are performed as shown in FIGS. 2C and 2D, in order to change the form of a mask layer 33b to a rectangular shape.

Referring to FIG. 2C, a photoresist 35c is coated on the substrate 31 to cover the mask layer 33b, and a stripe-shaped mask 38c is arranged thereon in a perpendicular direction to the mask layer 33b. Thereafter, exposure, development, and etching processes are performed so that the photoresist 35c is patterned into a stripe-shaped photoresist 35d that is perpendicular to the mask layer 33b, as shown in FIG. 2D.

Referring to FIG. 2D, regions of the mask layer 33b not covered by the stripe-shaped photoresist 35d are dry etched. Accordingly, the exposed portions of the mask layer 33b are removed so that a rectangular mask layer 33c is formed as shown in FIG. 2E.

Thereafter, referring to FIG. 2E, the etching process is performed to form the rectangular mask layer 33c and to remove the strip-shaped photoresist 35d.

Next, a tip is formed by performing a wet or dry etching process using the rectangular mask layer 33c as shown in FIG. 2F, in order to form a probe.

Referring to FIG. 2G, the source and the drain regions 32 and 34 are formed on the inclined surfaces of the tip 30, and the mask layer 33c located at the peak of the tip 30. When a thermal diffusion process is performed after the mask layer 33c is removed, the peak of the tip 30 of the probe can be sharp and the length of the channel 36 can be reduced.

Referring to FIG. 2H, the silicon layers on the left and the right sides of the channel region 36 of the tip 30 are doped to expand the source and the drain regions 32 and 34. In addition, insulating layers 37 are connected to the source and the drain regions 32 and 34 in order to insulate portions of the upper surface of the substrate 31.

Figure 2I:
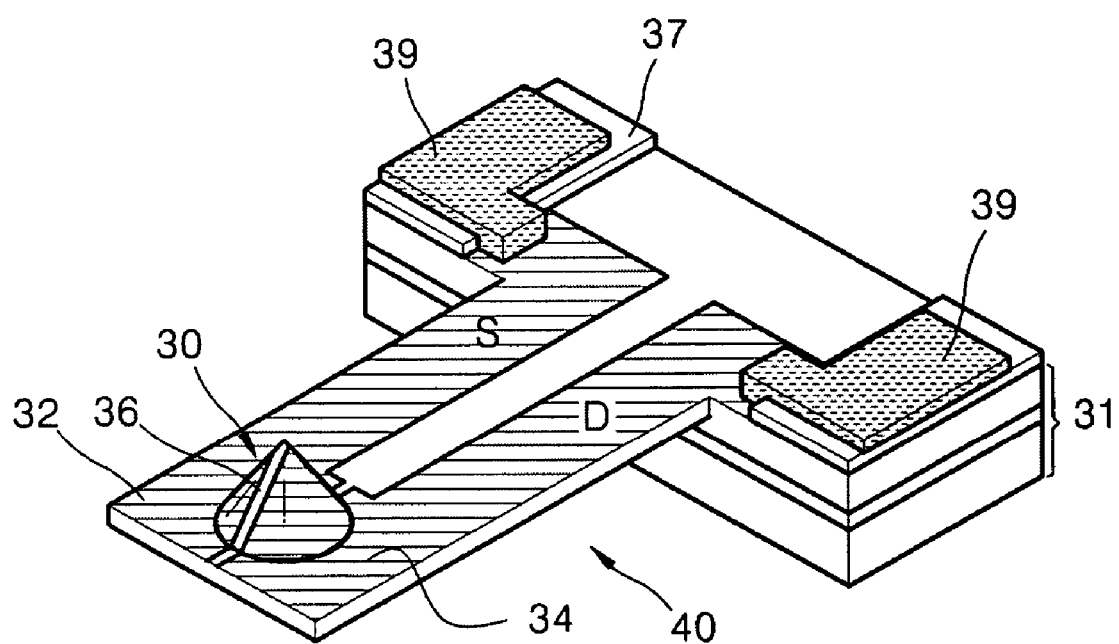

Referring to FIG. 2I, the backside of the substrate 31 is etched to release the cantilever.

Here, the insulating layers 37 are deposited on the portions of the silicon substrate 31, and electrodes 39 formed on the insulating layers 37 are connected to the source and the drain regions 32 and 34, respectively. A cantilever 41 is extended from the silicon layer on the substrate 31, and the tip 30 is formed on the surface of the cantilever 41 in a vertical direction.

The method of fabricating a probe according to the present invention uses a self-aligned fabrication utilizing the mask layer used for forming the source and the drain regions 32 and 34 as a mask for forming the tip 30 of the probe. In addition, the processes shown in FIGS. 2A through 2I can be used to fabricate the probe having a different shape from that of FIG. 2I.

Hereafter, methods of reproducing and recording information by using the probe fabricated by the method according to the present invention will be described with reference to FIGS. 3 and 4.

Figure 3:
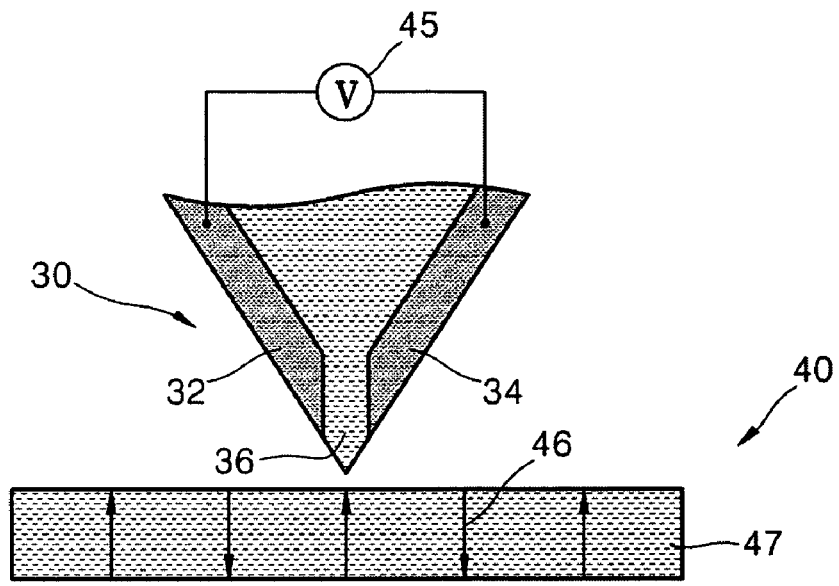
FIGS. 3 and 4 are views illustrating methods of reproducing information by using a probe for an SPM, fabricated according to the present invention.

Referring to FIG. 3, when the probe 30 is located above the positive surface charges of a recording medium 40 including a dielectric layer 47, the channel of minority carriers, electrons, is formed at the end of the tip 30 by the electric field generated from the surface charges. Therefore, the surface charges can be detected from currents that flow due to the difference between the voltage of the source region 32 and the voltage of the drain region 34.

Figure 4:
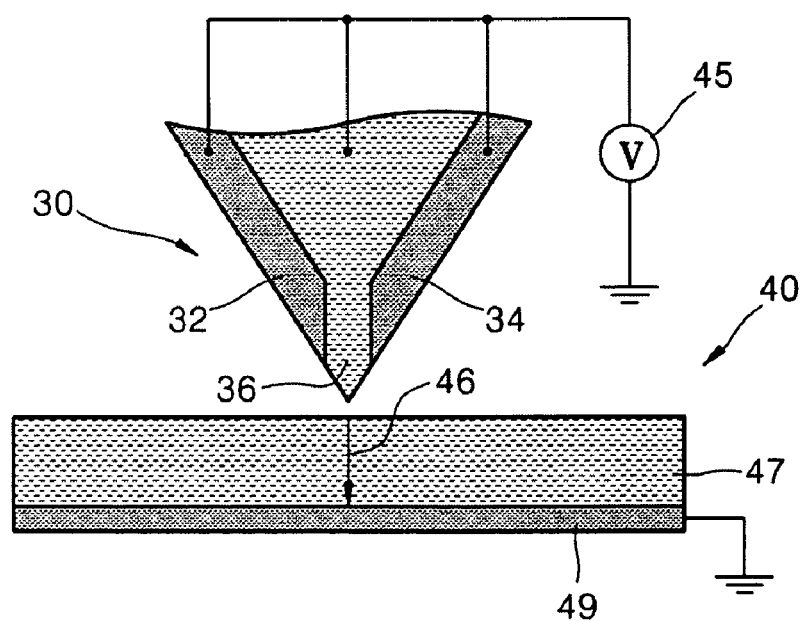

Referring to FIG. 4, when the probe 30 is placed above the dielectric layer 47 of the recording medium 40 and the same voltage is applied to the source region 32, the drain region 34, and the body portion of the tip 30, the dielectric is polarized due to the electric field that is concentrated between a bottom electrode 49 and the tip 30. Accordingly, information is recorded on the surface of the recording medium.

The method of fabricating the probe according to the present invention realizes a transistor having a short channel length at the tip, which is vertically formed at the end of the cantilever of the probe, by using the self-aligned fabrication that arranges the center of the channel at the center of the tip. Thus, the method can be used to easily fabricate a nano-device using a scanning probe technique that detects a small amount of surface charges existing in a small area on a recording medium.

In addition, when the information is recorded and reproduced on and from a large capacity and small sized recording apparatus utilizing the scanning probe technique by using the probe according to the present invention, the small amount of charges generated by polarized ferroelectrics can be easily reproduced and the charges can be easily recorded by generating polarization.

The drawings and specification of the invention are provided for illustration only and are not used to limit the scope of the invention set forth in the appended claims.

For example, a person skilled in the art can manufacture an apparatus for recording and reproducing information by using probes of various shapes according to the present invention.

As described above, a method of fabricating a probe aligns the center of a tip with the center of a channel existing between a source region and a drain region to realize a tip having a size of tens of nanometers. Thus, a nano-device can be easily manufactured using the probe having the tip.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of fabricating a probe, the method comprising:
   a first step of forming a first-shaped mask layer on a substrate and forming a source region and a drain region in regions of the substrate except for the region masked by the mask layer;
   a second step of patterning a first-shaped photoresist in a perpendicular direction to the mask layer and performing an etching process to form a second-shaped mask layer; and
   a third step of etching the regions of the substrate except for the region masked by the mask layer to form a probe.

2. The method of claim 1, wherein the first-shaped mask layer is a striped-shaped mask layer.

3. The method of claim 1, wherein the second-shaped mask layer is a square-shaped mask layer.

4. The method of claim 1, wherein the first step further comprises performing a thermal diffusion process to reduce the distance between the source region and the drain region.

5. The method of claim 1, wherein the ions are n-type ions, and the substrate is a p-type substrate.

6. The method of claim 1, wherein the ions are p-type ions, and the substrate is an n-type substrate.

* * * * *